United States Patent
Honeycutt et al.

(10) Patent No.: US 6,906,126 B2
(45) Date of Patent: Jun. 14, 2005

(54) DECREASING ALLERGENICITY OF NATURAL LATEX RUBBER PRIOR TO VULCANIZATION

(76) Inventors: Travis Honeycutt, 3544 Mill Rd., Gainesville, GA (US) 30504; Matthew P. Clark, 5685 Lenox Park Pl., Sugar Hill, CA (US) 30518

( * ) Notice: Subject to any disclaimer, the term of this patent is extended or adjusted under 35 U.S.C. 154(b) by 2 days.

(21) Appl. No.: 10/176,244

(22) Filed: Jun. 19, 2002

(65) Prior Publication Data

US 2003/0236346 A1 Dec. 25, 2003

(51) Int. Cl.$^7$ .................................................. C08K 3/28
(52) U.S. Cl. ....................... 524/428; 524/474; 524/475; 524/491; 524/575.5; 524/925
(58) Field of Search .................................. 524/428, 474, 524/475, 491, 575.5, 925

(56) References Cited

U.S. PATENT DOCUMENTS

| 5,910,567 A | | 6/1999 | Tanaka et al. | ......... 264/331.13 |
| 5,998,512 A | * | 12/1999 | Schloman | .................... 524/17 |

* cited by examiner

*Primary Examiner*—Peter D. Mulcahy

(57) ABSTRACT

A method for reducing allergenicity of natural latex rubber. The natural latex rubber, prior to its vulcanization, is admixed with mineral oil and extracted to reduce protein levels therein. Ideally, the mineral oil is characterized as having a density of approximately 0.818 to 0.880 and a viscosity of approximately 33.5 cf at 40° C.

23 Claims, No Drawings

DECREASING ALLERGENICITY OF NATURAL LATEX RUBBER PRIOR TO VULCANIZATION

FIELD OF THE INVENTION

The present invention relates to a method of reducing the allergenicity of natural latex rubber prior to its vulcanization. In doing so, the potential for allergic reactions due to the protein content of the natural latex rubber has been greatly reduced while maintaining its desirable physical properties when used in such products as latex gloves and similar medical and consumer goods.

BACKGROUND OF THE INVENTION

Beginning in the late 1980's allergic reactions associated with the use of latex gloves began to receive widespread recognition. These reactions varied greatly in degree but seemed to exhibit similar characteristics to acquired sensitivity reactions seen with other allergens. Although latex gloves have enjoyed a long history of usage dating back to the 1800's, the perceived need for protection from AIDS and HIV exposure during the 80's caused a tremendous increase in the use of gloves. This, in turn, resulted in a much-heightened exposure to the naturally occurring antigenic proteins contained in raw latex.

The last decade and a half has seen a great change in latex use as a result of publicity concerning these allergies. Today in the U.S. there is almost universal awareness of the risks associated with repeated latex exposure, particularly in the healthcare fields where exposure is more profound. Awareness of the risks, however, extends into the industrial glove market, and even to the general public, who have received risk warnings from various government and health-watch groups. As a result there exists much interest in the market, fueling a strong trend to reduce exposure to latex-associated allergens.

Manufacturers have responded in several ways: 1) reduction or elimination of donning powder, 2) utilization of chlorinated glove washing and additional processing steps to reduce antigenic protein load, 3) use of coatings to reduce actual contact with latex, and 4) introduction of alternative materials that mimic, natural latex performance characteristics. Each of these industry reactions represents compromises either from ease of use, performance, or cost standpoint. In short, nothing beats the tactile, comfort, and barrier protection that is provided by natural latex products.

In the last ten years there has been an increasing awareness of the possible immunologic and other reaction risks associated with the use of latex gloves. This awareness is the result of the proliferation in glove usage among healthcare workers in order to avoid potential exposure to HIV/AIDS transmission sources.

An increase in the reported incidence of latex allergic sensitivity and other skin reactions has been concomitant with increased glove usage. This has spurred an effort by industry leaders and manufacturers to reduce exposure to latex. Glove makers have initiated latex substitution in the manufacturer of gloves, elimination of donning powder (antigenic proteins leach in to the cornstarch powder and become airborne—a source of respiratory exposure and subsequent sensitization), and the introduction of methods to reduce overall protein content of gloves.

Latex rubber in its natural form consists of polymer, long chain molecules consisting of repeating units of isoprene:

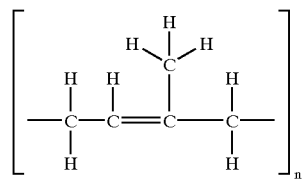

When it is harvested from the rubber tree, *Hevea brasiliensis*, the liquid, sticky substance also contains proteins like heavamine, hevein, and rubber elongation factor (REF). Although the basic isoprene polymer is non-antigenic, the associated proteins are highly antigenic. It is important to note this difference in order to minimize the antigenic impact of natural latex without destroying its underlying structure.

In its natural state, natural latex does not possess characteristics that are commercially useful. In order to achieve utilitarian value, including strength, elasticity, and memory, the chains of isoprene must be cross-linked to one another. Depending on the type of rubber end product desired, this is achieved with either application of heat and sulfur, or in the case of latex rubber used in the manufacture of gloves, various chemical accelerators that donate or bind sulfur, thus speeding the cross-linking process. The major accelerators are thiurams, mercaptobenzothaizoles (MBTs), and carbamates.

In addition to accelerators, latex glove manufacturers utilize another class of additives, called sensitizers, which most frequently consist of substituted phenols. These substances are used to impede oxidation, and resultant degradation, of natural latex.

Foreign materials, natural latex proteins, accelerators, and sensitizers can all provoke human reactions, but the allergenic reactions due to the proteins are considered to be by far the most problematic in the healthcare field. The following briefly describes three major types of foreign material reactions most commonly associated with latex use:

Irritant dermatitis is skin irritation that does not involve the body's immune response, that is, it is not an allergic response. Frequent hand washing and inadequate drying, aggressive scrubbing technique or detergents, mechanical abrasive effect of powder, climatic irritation, and emotional stress can all cause this condition. Even though this is not an allergic reaction, irritant hand dermatitis can cause breaks in the skin which can facilitate entry of the sensitizing latex protein or chemicals found in the commercial product, and in turn lead to latex allergy.

Delayed cutaneous hypersensitivity (type IV allergy) is contact (hand) dermatitis generally due to the chemicals used in latex production. It is mediated via T-cells causing a skin reaction that is typically seen 6–48 hours after contact. The reaction is local and limited to the skin that has contact with the glove. While not life threatening, those with type IV allergy are at increased risk to develop type I allergy. As in irritant dermatitis, the broken skin barrier can provide an entry site in to the body for foreign materials. This can produce sensitization to latex proteins leading to a more serious type of reaction.

The third and potentially most serious type of reaction sometimes associates with latex use is a true IgE/histamine-mediated allergy to protein (also called immediate, or type I hypersensitivity). This type of reaction can involve local or systemic symptoms. Local symptoms include contact urticaria (hives), which appears in the area where contact occurred, i.e., the hands, but can spread beyond that area and become generalized. More generalized reactions include allergic rhinoconjunctivitis and asthma. The presence of allergic manifestations to natural latex indicates an increased risk for anaphylaxis, a rare but serious reaction experienced by some individuals who have developed an allergy to certain proteins (e.g., insect stings, natural rubber, penicillin). This type I reaction can occur within seconds to minutes of exposure to the allergen. When such a reaction occurs, it can progress rapidly from swelling of the lips and airways, to shortness of breath, and may progress to shock and death, sometimes, within minutes. While any of these signs and symptoms may be the first indication of allergy, in many workers with continued exposure to the allergen, there is progression from skin to respiratory symptoms over a period of months to years. Some studies indicate that individuals with latex allergy are more likely than latex non-allergic persons to be atopic (have an increased immune response to some common allergens, with symptoms such as asthma or eczema). Once natural latex allergy occurs, allergic individuals continue to experience symptoms, which have included life-threatening reactions.

There are several classes of people known to be at increased risk for latex allergy. Medical patients who have had multiple hospitalizations and have been exposed numerous times to latex medical products, healthcare workers, and atopic individuals comprise this high-risk group. Current estimates are that 8–17% of healthcare workers become sensitized. Despite the recent emphasis on universal precautions, the marked increase in glove usage due to commutable disease prevention is largely blamed for the increase in latex allergies among these groups. Atopic individuals (those with other allergies or asthma) are at significantly greater risk to develop latex allergy than the general population. It is estimated that as many as 25–30% of atopic healthcare workers may become sensitized.

The problems presented by allergic reactions to latex are exacerbated by the proliferation and widespread use of latex based products. Latex presents great risk to persons in the health care industry where latex products are used extensively in the form of gloves, casts, dressings, tapes, catheters, tubes, drains, airway management devices, med delivery, tourniquets, monitoring devices, and others. One persistent threat lies in the cornstarch powder used to lubricate and ease donning of rubber gloves. The proteins absorb onto the powder and become aerosolized during use and when the gloves are donned and removed.

Products containing latex are also found throughout the home in the form of balloons, art supplies, toys, swimming equipment, contraceptive devices, cosmetics, bottle nipples, pacifiers, clothing, chewing gum, rubber bands, and others. Groups at risk include particularly children with spina bifida, who have been shown to have a very high risk of latex sensitivity, patients with congenital urologic abnormalities, healthcare providers and rubber industry workers.

Since the severe allergic reactions to latex are due to their naturally occurring proteins, the prior art offers little in the way of solutions. For example, "hypoallergenic" latex products are free from the vulcanization accelerator compounds that can cause dermatitis, but do not prevent immediate hypersensitivity reactions. Likewise, ammonia treatment of the natural rubber latex proteins can cause breakdown and precipitation of some latex proteins, but the allergenicity appears to be preserved and other antigenic latex proteins are unextractable. In short, the literature recommends that the only treatment available for latex allergy is avoidance.

The Food and Drug Administration (FDA), as well as other state and federal agencies, has received requests to ban the use of glove powder. It has been suggested that experimental and clinical studies demonstrate that glove powder on medical gloves can enhance foreign body reactions, increase infections and act as a carrier of natural latex allergens. The National Institute of Occupational Safety and Health (NIOSH) recently issued a safety alert recommending the use of powder-free, reduced protein content latex gloves to reduce exposure to natural latex proteins (allergens).

Experimental and clinical data demonstrate that natural rubber latex (NRL) proteins are allergenic. Further, natural latex proteins bind to cornstarch while aerosolized powder on NRL gloves is allergenic and can cause respiratory allergic reactions. Published studies support the conclusion that airborne glove powder represents a threat to individuals allergic to natural rubber latex and may represent an important agent for sensitizing non-allergic individuals. There are also published data (although limited) and clinical experience that cornstarch powder on NRL gloves may also be a contributing factor in the development of irritation and type IV allergy.

In addition to dusting powder, other lubricants may also be used in the manufacturing process. Latex and some polymers are tacky and gloves made of these materials stick to the mold or former. A mold-release lubricant such as calcium carbonate or a mixture of calcium carbonate and cornstarch is used to enable the removal of gloves from molds. The other side of the glove may be coated with a donning lubricant, such as cornstarch or silicone oils, to make donning gloves easier and to prevent gloves from sticking during the manufacturing process.

Over the past three years, the FDA has received requests to ban the use of all glove powders. These requests have been based on repeated clinical and experimental studies reporting that cornstarch on surgical gloves can damage tissue's resistance to infection, enhance the development of infection, serve as a potential source of occupational asthma, and provide a source of natural latex protein exposure to natural latex allergic individuals. The issues regarding the use of glove powder, except for the transport of natural latex protein allergens, apply to the use of glove powder on both natural rubber latex and synthetic gloves. Several states, acting on their own initiative have banned the sale and use of glove powders.

Thus, an object of the present invention is to teach a method of reducing the allergenicity of natural latex rubber prior to vulcanization to enable the creation of a commercial product relatively free of allergenicity with no apparent loss of physical properties.

SUMMARY OF THE INVENTION

The present invention is directed to a method of reducing allergenicity of natural latex rubber. The method comprises subjecting the natural latex rubber, prior to with vulcanization, to mineral oil to reduce protein levels in it. It is preferred that at least approximately 5% mineral oil by volume is admixed with the natural latex rubber and, ideally, approximately 10–25% mineral oil by volume is employed. The mineral oil is thoroughly admixed, preferably by constant agitation with the natural latex rubber and the admixture is subjected to centrifugation. The separated mineral oil containing protein extracted from the natural latex rubber can then be discarded or separated from the latex rubber and purified enabling the natural latex rubber to be further processed.

DETAILED DESCRIPTION OF THE INVENTION

As previously noted, the present invention involves a method of reducing allergenicity of natural latex rubber. The natural latex rubber is subjected to a mineral oil under constant agitation to produce an intimate admixture. Ideally, at least approximately 5% mineral oil by volume is admixed with the natural latex rubber and, preferably, 10–25% mineral oil (by volume) is employed.

Once the suitable admixture is created, the natural latex rubber separated from the mineral oil which, by that time, contains protein extracted from the natural latex rubber. It is found that at least 30 minutes of constant agitation is required to enable appropriate extraction of the protein content from the natural latex rubber whereupon, the mineral oil containing protein is separated and further processed or discarded. This can be done by allowing the sample to settle, undisturbed, for a period of time. Once settling has taken place, for example over a period of 24 hours, the sample can be subject to centrifugation and the deprotenized natural latex rubber held for further processing once the mineral oil containing protein has been separated.

Although there are various suitable candidates for use herein, it has been found that mineral oil having a density of from approximately 0.818 to 0.880 is ideal. Further, the mineral oil should preferably exhibit a viscosity of approximately 33.5 cf measured at 40° C.

After the protein has been removed pursuant to the present invention, water can optionally be added to the natural latex rubber together with trace amounts of ammonia. Ideally, approximately 1000 ppm ammonia is employed in a water charge approximately equal in volume to the volume of natural latex rubber being processed. This admixture can be created under constant agitation for approximately 30 minutes whereupon centrifugation again takes place separating the water phase from the natural latex rubber, the former of which being then discarded. The use of an additional water bath together with similar trace amounts of ammonia can also be employed.

EXPERIMENTAL DATA

A series of films were created, a first being a control sample of natural latex rubber. This material was applied to a glass plate.

A series of four additional films were created, in each instance, using the same natural latex rubber which was employed to make the above-reference film. Equal amounts by volume of mineral oil were added having a density of 0.818–0.880 and a viscosity of 33.5 cf at 40° C. The admixture was subjected to constant agitation by shaking for 30 minutes whereupon the sample was allowed to settle undisturbed for 24 hours. It was then subjected to a centrifuge to separate the mineral oil containing protein which was thereupon reused.

The natural latex rubber which was subject to the above-recited protein extraction was then mixed with an equal volume of distilled water containing 1000 ppm ammonia. This was then mixed under constant agitation for 30 minutes whereupon the admixture was separated by centrifugation and the aqueous phase discarded. This water/ammonia addition was repeated a second time to stabilize the natural latex rubber and the samples spread as films on glass plates and labeled "sample A."

A second set of films were created labeled "sample B." Sample B differed from sample A in that between the two water/ammonia additions, a second addition of mineral oil was added to the natural latex rubber product. By doing so, the efficiency of the first protein extraction could be measured and it could then be determined whether multiple protein extractions using mineral oil were justified.

Two films from "process A" and two films from "process B" were analyzed by conducting both Lowry assays as well as LEAP assays. The following results were measured noting that, in addition to the films, a control sample of liquid natural latex rubber was also scrutinized.

| | LOWRY ASSAY | | | | | |
|---|---|---|---|---|---|---|
| Sample Identification | Sample Weight (g) | Extract Volume (ml PBS) | Lowry Assay Conc. (ug/ml) | Surface Area dm$^2$ | Total Protein Concentration (ug/g) | (ug/dm$^2$) |
| Control, Liquid | 1.0 | 1 | 36440 | N/A | 36440 | N/A |
| Film From Liquid Latex No Treatment | 13.8 | 41 | 250 | 7.0 | 750 | 1473 |
| Film From Process "A" | 5.1 | 15 | b.d. | 7.0 | <28 | <20 |
| Film From Process "B" | 4.7 | 14 | b.d. | 9.0 | <28 | <15 |
| Film From Process "A" | 8.2 | 25 | b.d. | 6.4 | <28 | <36 |
| Film From Process "B" | 3.3 | 10 | b.d. | 0.4 | <28 | <230 |

| | LEAP ASSAY | | | | | |
|---|---|---|---|---|---|---|
| Sample Identification | Sample Weight (g) | Extract Volume (ml PBS) | LEAP Assay Conc. (ug/ml) | Surface Area dm$^2$ | Antigenic Protein Concentration (ug/g) | (ug/dm$^2$) |
| Control, Liquid | 1.0 | 1 | 1861.8 | N/A | 1861.80 | N/A |
| Film From Liquid Latex No Treatment | 13.8 | 41 | 97.0 | 7.0 | 291.0 | 571.6 |
| Film From Process "A" | 5.1 | 15 | .01 | 7.0 | .02 | .02 |
| Film From Process "B" | 4.7 | 14 | 0.1 | 9.0 | .03 | .02 |
| Film From Process "A" | 8.2 | 25 | 0.04 | 6.4 | .01 | 0.2 |
| Film From Process "B" | 3.3 | 10 | .2 | 7.4 | 0.5 | 0.2 |

It is quite apparent from the test data which was developed and reported above that dramatic reduction in protein levels is achieved by the relatively simple process of extracting protein with a mineral oil prior to the vulcanization of the natural latex rubber. In doing so, products can be produced reducing risks imposed upon users of natural latex rubber products, including healthcare professionals, as a result of type I hypersensitivity. Most importantly, this is accomplished without diminishing the physical properties of natural latex rubber which makes commercial products made from this material so desirable.

What is claimed is:

1. A method of reducing allergenicity of natural latex rubber, said method comprising subjecting said natural latex rubber, prior to its vulcanization, to mineral oil to reduce protein levels in said natural latex rubber, wherein said natural latex rubber and said mineral oil are admixed and thereupon, said natural latex rubber is separated from said mineral oil containing protein extracted from said natural latex rubber.

2. The method of claim 1 wherein said natural latex rubber and mineral oil are admixed with substantially constant agitation for a period of at least approximately 30 minutes prior to separation.

3. The method of claim 1 wherein said separation is carried out by centrifugation.

4. The method of claim 1 wherein water-containing ammonia is added to the natural latex rubber after said mineral oil-containing protein extracted from said natural latex rubber has been discarded.

5. The method of claim 4 wherein approximately equal amounts by volume of said water-containing ammonia are added to said natural latex rubber.

6. The method of claim 4 wherein approximately 1,000 ppm ammonia are added to said natural latex rubber.

7. The method of claim 4 wherein said water-containing ammonia is mixed with said natural latex rubber and thereupon separated from said natural latex rubber and thereupon separated from said natural latex rubber and discarded.

8. The method of claim 7 wherein another water-containing ammonia addition is made to said natural latex rubber, mixed therewith and subsequently discarded.

9. The method of claim 1 wherein said mineral oil is characterized as having a density of from approximately 0.818 to 0.880.

10. The method of claim 1 wherein said mineral oil is characterized as having a viscosity of approximately 33.5 cf at 40° C.

11. A method of reducing allergenicity of natural latex rubber, said method comprising admixing, prior to vulcanization, mineral oil and natural latex rubber, subjecting the admixture of natural latex rubber and mineral oil to agitation, and separating said natural latex rubber from said mineral oil-containing protein.

12. The method of claim 11 wherein said natural latex rubber and mineral oil-containing protein are separated by centrifugation.

13. The method of claim 11 wherein at least approximately 5% mineral oil by volume to the volume of natural latex rubber is employed for reducing said allergenicity.

14. The method of claim 11 wherein approximately 10–25% mineral oil by volume to the volume of natural latex rubber is employed for reducing said allergenicity.

15. The method of claim 11 wherein said agitation is carried out for period of at least approximately 30 minutes prior to separation.

16. The method of claim 11 wherein water-containing ammonia is added to the natural latex rubber after discarding the mineral oil-containing protein.

17. The method of claim 16 wherein approximately equal amounts by volume of said water-containing ammonia are added to said natural latex rubber.

18. The method of claim 17 wherein approximately 1000 ppm ammonia is contained in said water.

19. The method of claim 17 wherein said water-containing ammonia is admixed with said natural latex rubber and thereupon separated from said natural latex rubber and discarded.

20. The method of claim 11 wherein said mineral oil is characterized as having a density of from approximately 0.818 to 0.880.

21. The method of claim 11 wherein said mineral oil is characterized as having a viscosity of approximately 33.5 cf at 40° C.

22. A method of reducing allergenicity of natural latex rubber, said method comprising, admixing, prior to vulcanization, mineral oil having a density of from approximately 0.818 to 0.880 and a viscosity of approximately 33.5 cf at 40° C., with natural latex rubber, subjecting the admixture of natural latex rubber and mineral oil to agitation for a period of at least approximately 30 minutes, separating said natural latex rubber from the mineral oil-containing protein extracted from said natural rubber by centrifugation and discarding said mineral oil containing protein.

23. The method of claim 22 wherein approximately 10–25% mineral oil by volume to the volume of natural latex rubber is employed for reducing said allergenicity.

* * * * *